(12) United States Patent
Calder et al.

(10) Patent No.: US 9,188,026 B2
(45) Date of Patent: Nov. 17, 2015

(54) APPARATUS FOR FACILITATING ACCESS TO A NACELLE INTERIOR AND METHOD OF ASSEMBLING THE SAME

(75) Inventors: David P. Calder, Baltimore, MD (US); Graham F. Howarth, Middletown, DE (US)

(73) Assignee: MRA Systems, Inc., Baltimore, MD (US)

( * ) Notice: Subject to any disclaimer, the term of this patent is extended or adjusted under 35 U.S.C. 154(b) by 403 days.

(21) Appl. No.: 13/524,127

(22) Filed: Jun. 15, 2012

(65) Prior Publication Data

US 2012/0280082 A1 Nov. 8, 2012

Related U.S. Application Data

(63) Continuation-in-part of application No. 12/324,429, filed on Nov. 26, 2008, now Pat. No. 8,220,738.

(51) Int. Cl.
*B64D 29/06* (2006.01)
*F01D 25/28* (2006.01)
*F02C 7/20* (2006.01)

(52) U.S. Cl.
CPC ............... *F01D 25/28* (2013.01); *B64D 29/06* (2013.01); *F02C 7/20* (2013.01); *F05D 2230/72* (2013.01)

(58) Field of Classification Search
CPC ............ F01D 25/28; B64D 29/06; F02C 7/20
USPC .......................... 244/54, 129.4, 129.5, 110 B
See application file for complete search history.

(56) References Cited

U.S. PATENT DOCUMENTS

| | | | | |
|---|---|---|---|---|
| 3,280,562 A * | 10/1966 | Theits et al. | ............... | 60/229 |
| 3,981,450 A * | 9/1976 | McCardle et al. | ........ | 239/265.31 |
| 4,005,822 A * | 2/1977 | Timms | ............... | 239/265.31 |
| 4,047,682 A * | 9/1977 | Brownhill | ............... | 244/110 B |
| 4,278,220 A * | 7/1981 | Johnston et al. | ........ | 244/110 B |
| 4,313,581 A * | 2/1982 | Folmer et al. | ........ | 244/110 B |
| 4,825,648 A * | 5/1989 | Adamson | ............... | 60/226.1 |
| 4,826,106 A * | 5/1989 | Anderson | ............... | 244/117 R |
| 5,228,641 A * | 7/1993 | Remlaoui | ............... | 244/110 B |
| 5,448,884 A * | 9/1995 | Repp | ............... | 60/223 |
| 5,609,313 A * | 3/1997 | Cole et al. | ............... | 244/54 |
| 6,021,636 A * | 2/2000 | Johnson et al. | ........ | 60/226.2 |
| 6,129,311 A * | 10/2000 | Welch et al. | ........ | 244/117 R |
| 6,220,546 B1 * | 4/2001 | Klamka et al. | ........ | 244/129.4 |
| 6,334,588 B1 * | 1/2002 | Porte | ............... | 244/129.4 |
| 6,334,730 B1 * | 1/2002 | Porte | ............... | 403/104 |
| 6,340,135 B1 * | 1/2002 | Barton | ............... | 244/53 B |
| 6,438,942 B2 * | 8/2002 | Fournier et al. | ........ | 60/226.2 |
| 6,622,963 B1 * | 9/2003 | Ahrendt et al. | ........ | 244/54 |
| 6,625,972 B1 * | 9/2003 | Sternberger | ............... | 60/226.2 |
| 6,935,097 B2 * | 8/2005 | Eschborn | ............... | 60/226.2 |
| 7,334,393 B2 * | 2/2008 | Porte | ............... | 60/226.1 |
| 8,136,341 B2 * | 3/2012 | Stephan et al. | ........ | 60/226.2 |

(Continued)

*Primary Examiner* — Tien Dinh
*Assistant Examiner* — Steven Hawk
(74) *Attorney, Agent, or Firm* — General Electric Company; William S. Munnerlyn (57) ABSTRACT

A nacelle for housing an engine includes a fan cowl sized to cover at least a first axial portion of the engine. The engine includes an inlet end, an exhaust end, and an axis extending through the engine from the inlet end through the exhaust end. The fan cowl is coupled to an engine mounting pylon via a slider-type mounting system that includes at least one slider track assembly defining at least one slot therein. The at least one slot is configured to receive at least one fan cowl slider fitting.

20 Claims, 11 Drawing Sheets

(56) References Cited

U.S. PATENT DOCUMENTS

| | | |
|---|---|---|
| 2006/0145001 A1* | 7/2006 | Smith ................... 244/110 B |
| 2007/0278345 A1* | 12/2007 | Oberle et al. ............. 244/53 R |
| 2008/0110153 A1* | 5/2008 | Seda et al. ................. 60/226.2 |
| 2008/0112801 A1* | 5/2008 | Moniz et al. ............. 415/208.1 |
| 2008/0112802 A1* | 5/2008 | Orlando et al. ........... 415/208.1 |
| 2010/0001123 A1* | 1/2010 | Hillereau et al. ............. 244/54 |
| 2010/0064659 A1* | 3/2010 | Wang ......................... 60/226.2 |
| 2010/0229527 A1* | 9/2010 | Amkraut et al. ............ 60/226.2 |
| 2010/0229528 A1* | 9/2010 | Ramlaoui et al. ........... 60/226.2 |
| 2011/0296813 A1* | 12/2011 | Frank et al. .................... 60/230 |

* cited by examiner

FIG. 12

APPARATUS FOR FACILITATING ACCESS TO A NACELLE INTERIOR AND METHOD OF ASSEMBLING THE SAME

CROSS REFERENCE TO RELATED APPLICATIONS

This application is a continuation-in-part of U.S. patent application Ser. No. 12/324,429, filed Nov. 26, 2008, now U.S. Pat. No. 8,220,738 entitled, "Nacelle and Method of Assembling the Same," which is incorporated by reference herein in its entirety.

BACKGROUND OF THE INVENTION

The field of this disclosure relates generally to nacelles and, more particularly, to apparatus that facilitates attaining access to an interior of a nacelle for engine access and maintenance.

Many known gas turbine engine assemblies include a nacelle that houses an engine. At least some known nacelles include a cowl that has hinged sections that can be propped open using support rods to permit engine maintenance. However, when propped open, the cowl sections may be subjected to significant wind gusts, requiring the cowl sections to be strengthened and the support rods to be sized larger in order to withstand the wind gusts when the cowl is in the open position. However, stronger cowl sections and larger hold-open components increase the overall weight of the engine assembly, thereby decreasing the fuel efficiency of the engine and increasing the costs associated with operating the engine.

As such, a nacelle that enables a cowl to remain open while reducing wind loads on the cowl would facilitate decreasing the overall weight of the cowl and associated hold-open components, thereby increasing engine efficiency by reducing fuel consumption.

BRIEF DESCRIPTION OF THE INVENTION

In one aspect, a nacelle is provided. The nacelle houses an engine. The engine includes an inlet end, an exhaust end, and an axis extending through the engine from the inlet end through the exhaust end. The nacelle includes a fan cowl sized to cover at least a first axial portion of the engine. The fan cowl is coupled to an engine mounting pylon via a slider-type mounting system that includes at least one slider track assembly defining at least one slot therein. The at least one slot is configured to receive at least one fan cowl slider fitting.

In another aspect, a method of assembling a nacelle for a gas turbine engine is provided. The engine includes an inlet end, an exhaust end, and an axis that extends through the engine from the inlet end through the exhaust end. The method includes providing a fan cowl sized to cover at least a first axial portion of the engine and extending the fan cowl about the first axial portion of the engine. The method also includes providing a slider-type mounting system including at least one slider track assembly defining at least one slot therein. The at least one slot is configured to receive at least one fan cowl slider fitting. The method further includes coupling the fan cowl to an engine mounting pylon via the slider-type mounting system.

DETAILED DESCRIPTION OF THE INVENTION

The following detailed description illustrates a nacelle by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a nacelle. However, it is contemplated that this disclosure has general application to cowls in a broad range of systems and in a variety of industrial and/or consumer applications.

Figure 1:
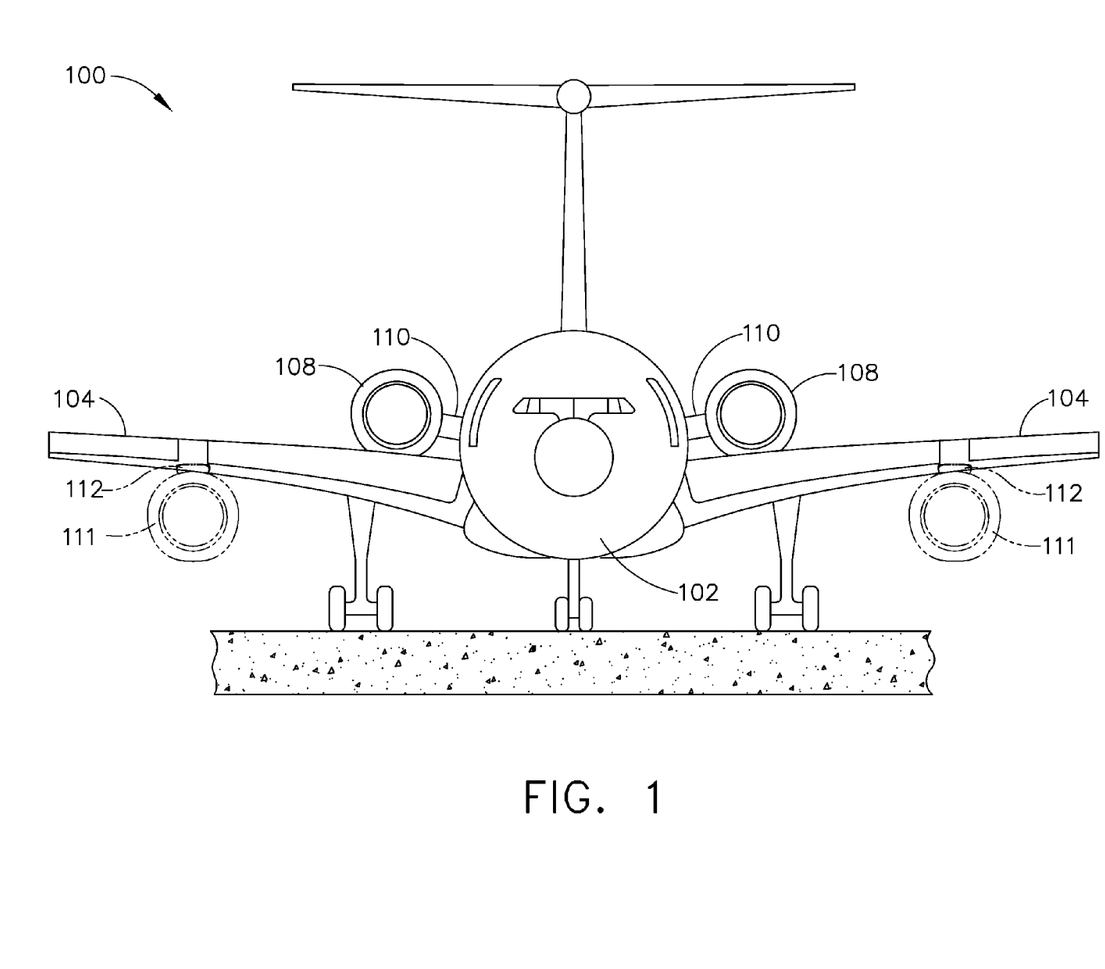
FIG. 1 is a schematic view of an aircraft.

FIG. 1 is a schematic view of an aircraft 100 including a fuselage 102 and a pair of wings 104. In one embodiment, aircraft 100 includes a pair of fuselage-mounted engine assemblies 108 coupled to, and extend outboard from, fuselage 102 via a pair of mounting structures, i.e., a pair of fuselage pylons 110. Wing-mounted engine assemblies 111 are suspended downward from wings 104 via a pair of mounting structures, i.e., a pair of wing pylons 112. Fuselage pylons 110 and wing pylons 112 may be coupled to fuselage 102 and wings 104, respectively, using any suitable coupling arrangement (e.g., a bolted arrangement). Wing-mounted engine assemblies 111 and fuselage-mounted engine assemblies 108 are substantially similar with the exception of mounting orientation.

Figure 2:
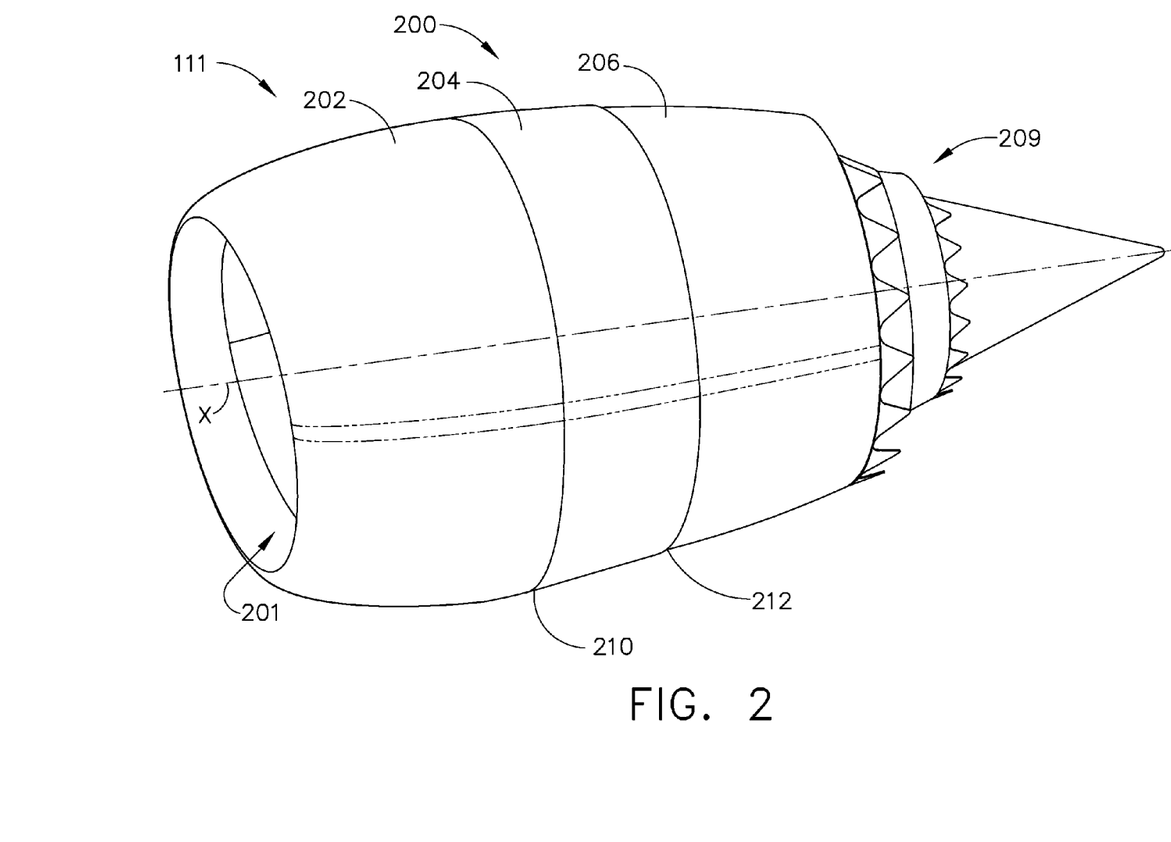
FIG. 2 is a perspective view of an exemplary fuselage-mounted engine assembly and nacelle for use on the aircraft shown in FIG. 1.

FIG. 2 is a perspective view of wing-mounted engine assembly 111 and nacelle 200. In the exemplary embodiment, engine assembly 111 includes a generally annular nacelle 200 that is coupled about a gas turbine engine. Nacelle 200 includes an inlet 202, a fan cowl 204, and a translating cowl 206 (hereinafter referred to as a "transcowl"). Inlet 202 circumscribes an inlet end 201 of the engine and facilitates providing air to engine assembly 111. Inlet 202 is de-mountably coupled to an engine fan frame (not shown) and is considered part of the de-mountable power plant that is removed for infrequent repair and maintenance actions only.

Fan cowl 204 encloses an engine fan case (not shown) such that a first end 210 of fan cowl 204 abuts inlet 202 and such that a second end 212 of fan cowl 204 overlaps a portion of transcowl 206. Fan cowl 204 is configured to open to provide regular maintenance access to engine assembly 111 and fan case mounted accessories (not shown). Fan cowl 204 is supported from pylon 112 (shown in FIG. 1) (pylon 110 for fuselage-mounted engine assemblies 108). Alternatively, fan cowl 204 is coupled to a mounting structure, e.g., a mounting frame (not shown) that is coupled to pylon 112.

Translating cowl 206 circumscribes an exhaust end 209 of the engine, such that an engine axis X extends through a center of the engine from inlet end 201 through exhaust end 209. Translating cowl 206 is the external component of a thrust reverser (not shown) that generates reverse thrust when required. Alternatively, inlet 202, fan cowl 204, and/or transcowl 206 may have any suitable diameters and may be positioned relative to one another in any suitable manner that enables operation of nacelle 200 as described herein.

Figure 3:
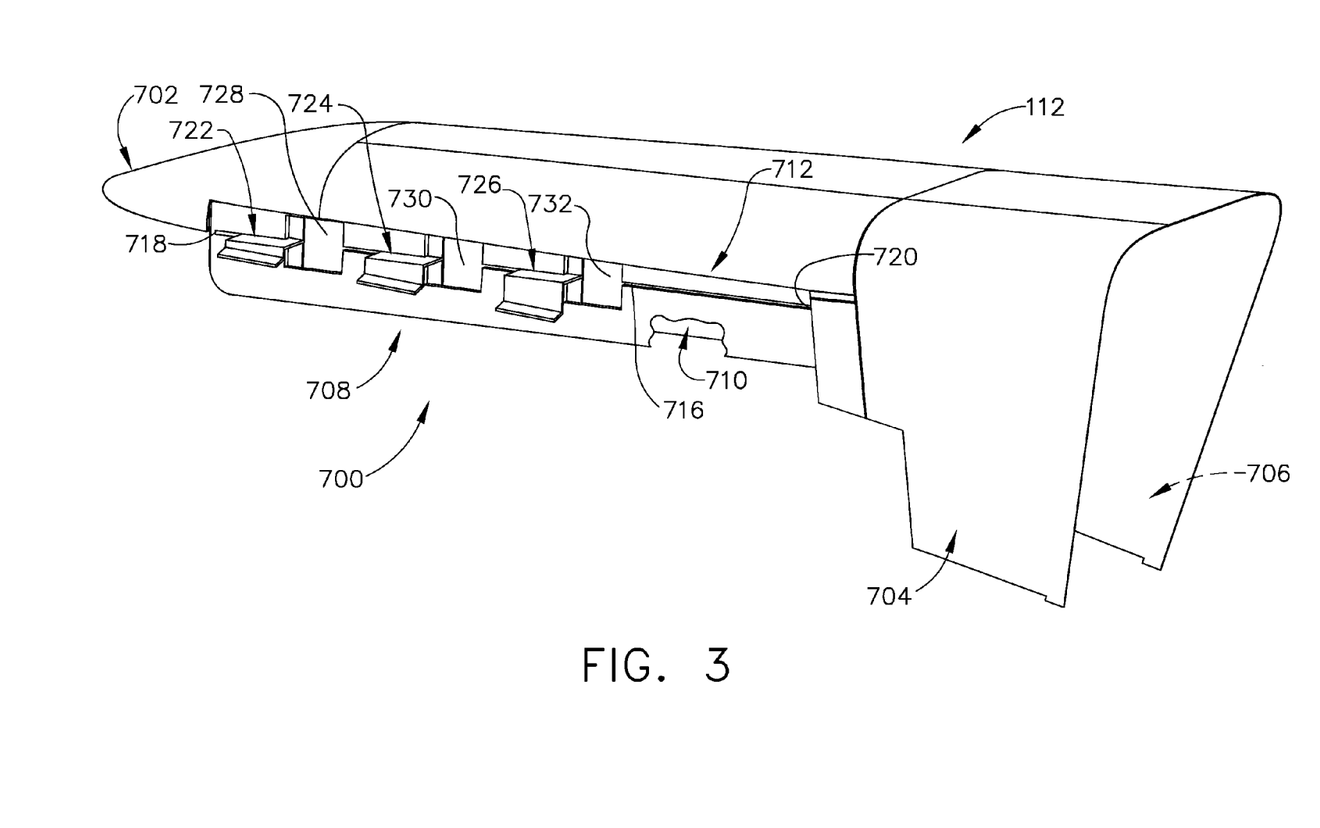
FIG. 3 is a perspective view of an exemplary slider-type mounting system for use in coupling the wing-mounted engine assembly and nacelle shown in FIG. 2 to a wing of the aircraft shown in FIG. 1.
Figure 4:
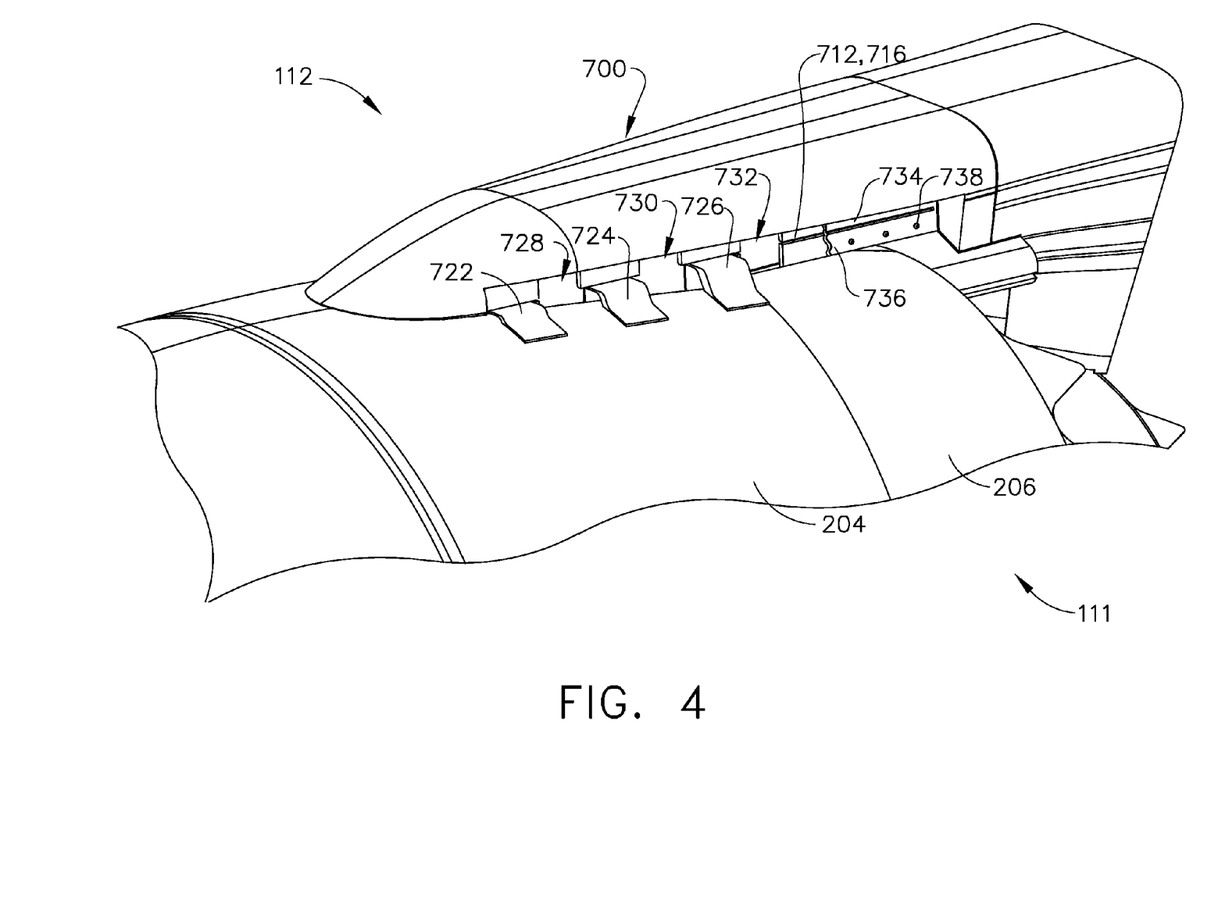
FIG. 4 is an enlarged perspective view of the slider-type mounting system shown in FIG. 3.
Figure 5:
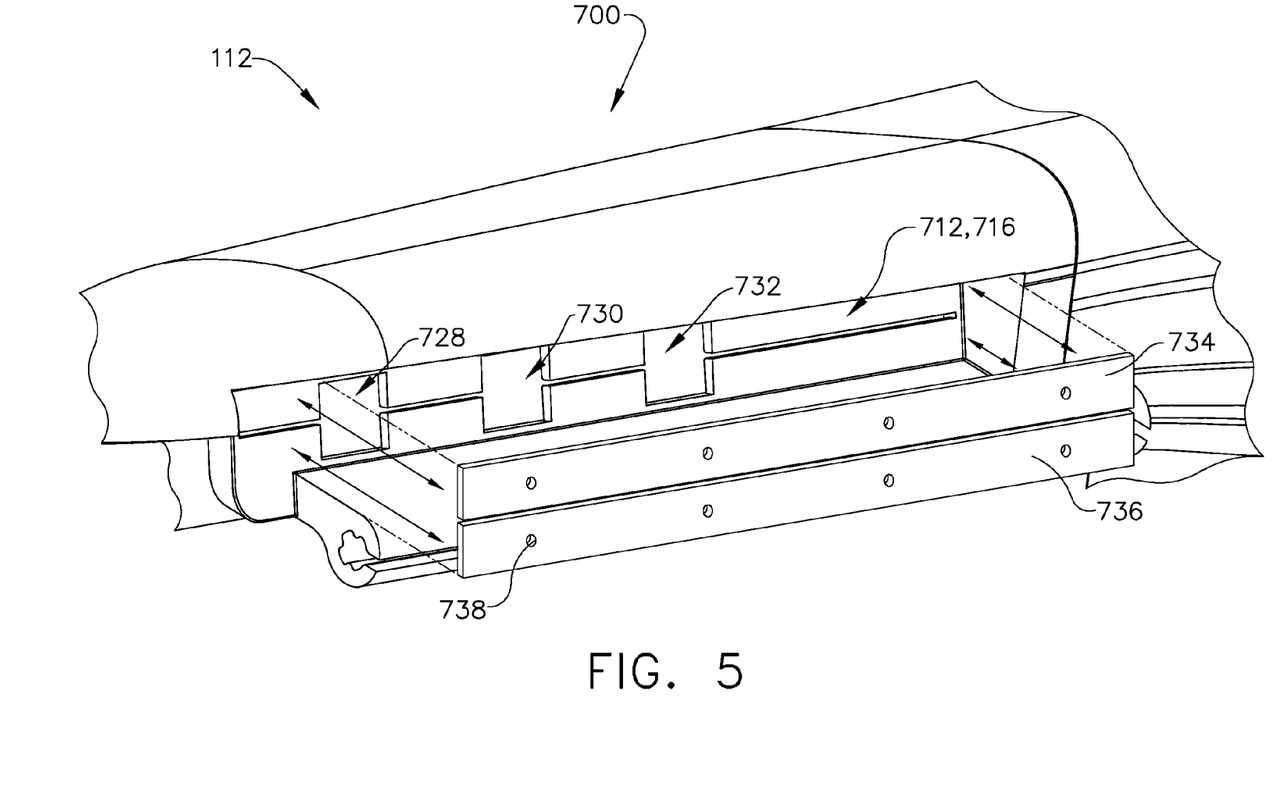
FIG. 5 is a further enlarged perspective view of the slider-type mounting system shown in FIG. 4.

FIG. 3 is a perspective view of an exemplary slider-type mounting system 700 for use in coupling wing-mounted engine assembly 111 (shown in FIG. 1) and nacelle 200 (shown in FIG. 2) to wing 104 of aircraft 100 (both shown in FIG. 1). FIG. 4 is an enlarged perspective view of slider-type mounting system 700. FIG. 5 is a further enlarged perspective view of slider-type mounting system 700. In the exemplary embodiment, wing pylon 112 includes a nose fairing 702, a first side 704, and a second side 706. Wing pylon 112 also includes mounting system 700 that facilitates mounting wing-mounted engine assembly 111 to wing pylon 112. Mounting system 700 includes a first slider track assembly 708 positioned on first side 704 and a second slider track assembly 710 positioned on second side 706. First slider track assembly 708 and second slider track assembly 710 are substantially similar and may be formed integrally with and/or coupled to, e.g., without limitation, bolted to any suitable portion of wing pylon 112 that enables slider track assemblies 708 and 710 to function as described herein. First slider track assembly 708 includes a fan cowl slider track 712 that extends substantially parallel to engine axis X (shown in FIG. 2) when engine assembly 111 and nacelle 200 are coupled to wing pylon 112. Fan cowl slider track 712 includes a T-shaped slot 716 that extends from a forward end 718 to an afterward end 720. In other embodiments, slot 716 may have any suitable shape that enables fan cowl slider track 712 to function as described herein. A first slider fitting 722, a second slider fitting 724, and a third slider fitting 726 are removably coupleable to fan cowl 204 and are positioned within, and are slideable along, slot 716.

Also, in the exemplary embodiment, slider fittings 722, 724, and 726 are T-shaped to facilitate retaining slider fittings 722, 724, and 726 within slot 716. Alternatively, slider fittings 722, 724, and 726 may have any suitable shape that enables mounting system 700 to function as described herein. A first cutout 728, a second cutout 730, and a third cutout 732 are defined within slot 716 to facilitate removing first slider fitting 722, second slider fitting 724, and third slider fitting 726, respectively, from slot 716.

In the exemplary embodiment, slider fittings 722, 724, and 726 and fan cowl slider track 712, including T-shaped slot 716, are configured with similar physical features and are oriented to cooperate with each other to facilitate engagement and dis-engagement of fan cowl 204 for installation and removal with respect to nacelle 200. Also, slider fittings 722, 724, and 726 and fan cowl slider track 712, including T-shaped slot 716, are configured with similar physical features and are oriented to align to facilitate an aerodynamic profile and sufficient structural load transfer.

Further, in the exemplary embodiment, mounting system 700 includes an upper slider fitting retention plate 734 and a lower slider fitting retention plate 736. Retention plates 734 and 736 are removably coupled via a plurality of bolts 738 to wing pylon 112 to substantially cover cutouts 728, 730, and 732 to facilitate retaining slider fittings 722, 724, and 726 within slot 716 by restricting transverse motion of slider fittings 722, 724, and 726. Retention plates 734 and 736 are spaced apart from one another to facilitate enabling slider fittings 722, 724, and 726 to slide along slot 716.

Figure 6:
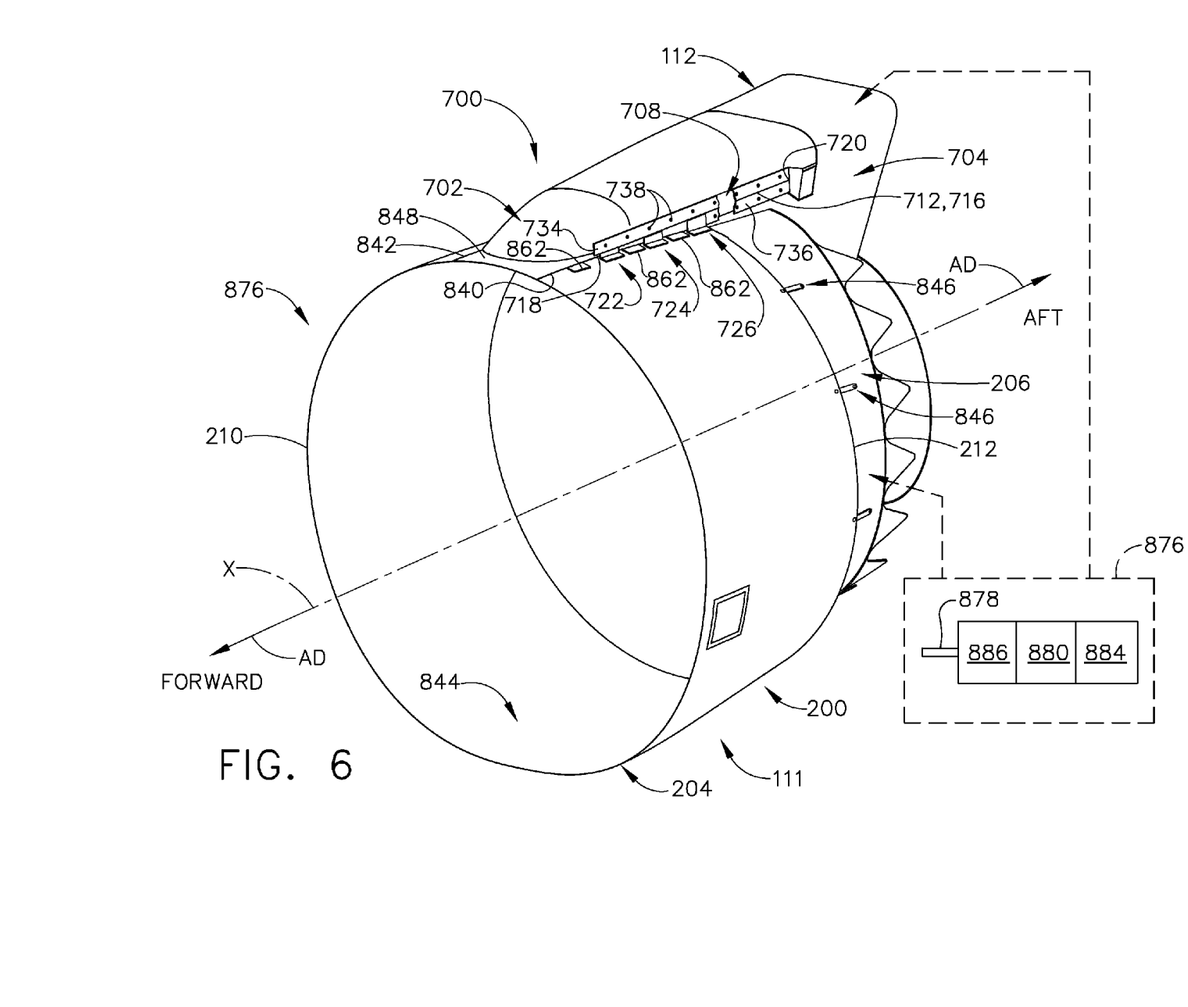
FIG. 6 is a perspective view of a portion of the wing-mounted engine assembly and nacelle shown in FIG. 2 coupled to the wing shown in FIG. 1.
Figure 7:
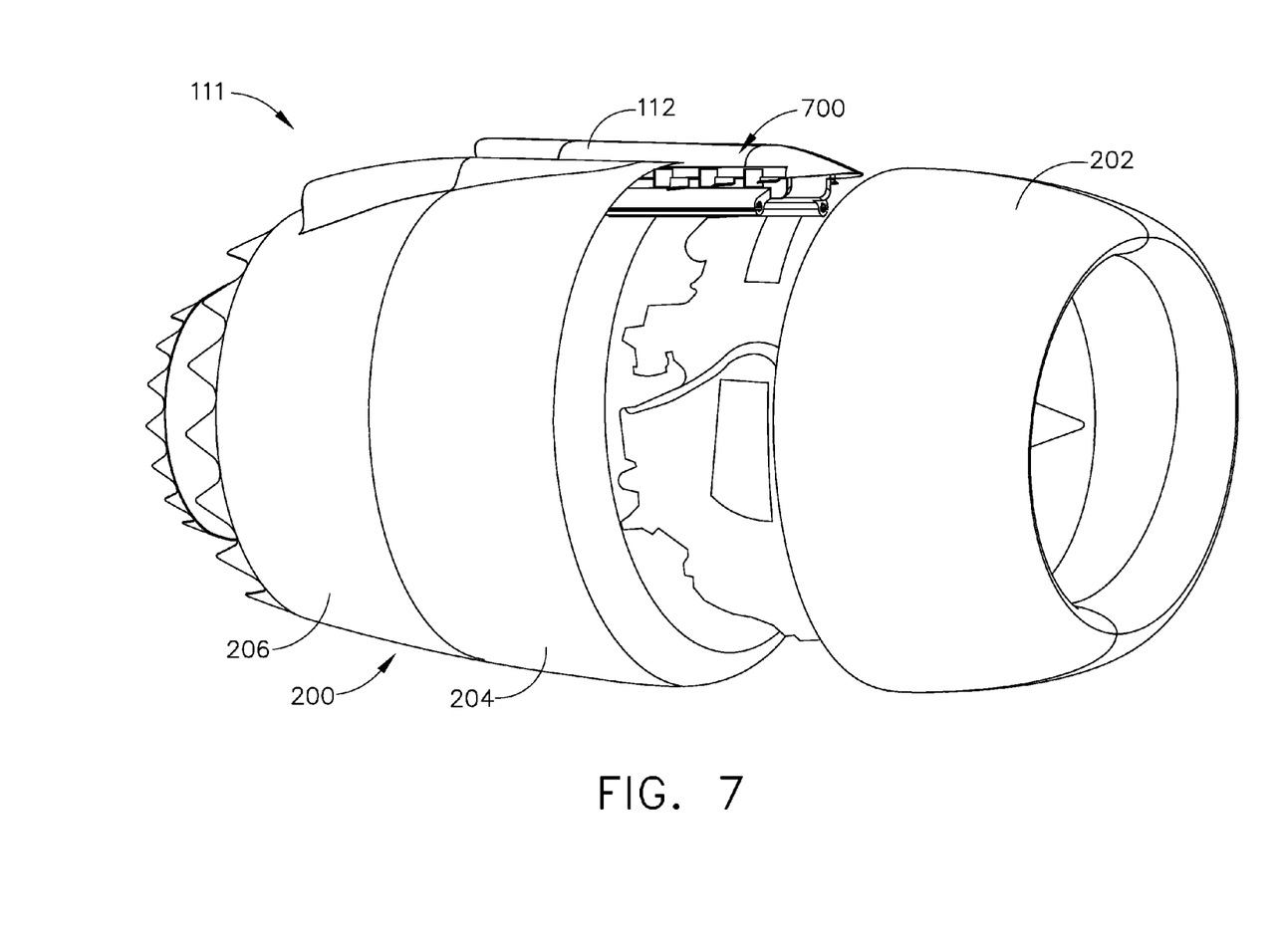
FIG. 7 is a perspective view of the wing-mounted engine assembly and nacelle shown in FIG. 2 with an exemplary fan cowl in the open and aft position.

FIG. 6 is a perspective view of a portion of wing-mounted engine assembly 111 and nacelle 200 coupled to wing pylon 112. FIG. 7 is a perspective view of wing-mounted engine assembly 111 and nacelle 200 with fan cowl 204 in the open and aft position after sliding aft along wing pylon 112 using slider-type mounting system 700, thereby at least partially overlaying transcowl 206.

In the exemplary embodiment, fan cowl 204 includes a first edge 840, a second edge 842, and an arcuate body 844 extending from first edge 840 to second edge 842 such that first edge 840 and second edge 842 are spaced apart from one another. First edge 840 is coupled to first side 704 of wing pylon 112 via first track assembly 708, and second edge 842 is coupled to second side 706 (shown in FIG. 7) of wing pylon 112 via second track assembly 710 (shown in FIG. 7). In the exemplary embodiment, first edge 840 is coupled to first side 704 in the same manner as second edge 842 is coupled to second side 706. With respect to coupling first edge 840 to first side 704, first slider fitting 722, second slider fitting 724, and third slider fitting 726 are coupled to fan cowl 204 proximate first edge 840 such that fan cowl 204 is slideable along slot 716 in aft axial direction AD and toward exhaust end 209 (shown in FIG. 2). In one embodiment, transcowl 206 is also slideable toward exhaust end 209 such that fan cowl 204 and transcowl 206 are independently slideable relative to one another and/or relative to wing pylon 112.

In another embodiment, fan cowl 204 and transcowl 206 are coupled together at fan cowl second end 212 via a plurality of tabs or links 846 such that fan cowl 204 is movable together with transcowl 206. In the exemplary embodiment, an apron 848 extends from nose fairing 702 into alignment with fan cowl first end 210 between first edge 840 and second edge 842 to facilitate covering an opening defined between nose fairing 702, inlet 202 (shown in FIG. 2), first edge 840, and second edge 842.

Also, in the exemplary embodiment, a power drive system 876 is coupled to fan cowl 204 at, or proximate to, fan cowl second end 212 to facilitate moving fan cowl 204 relative to transcowl 206, as described herein. Power drive system 876 is positioned in transcowl 206 or wing pylon 112. In some embodiments, all, or portions of, a transcowl translation system (not shown) perform the functions of power drive system 876 or those functions supplemented with power drive system 876. In such embodiments, ground support equipment may be used to temporarily couple fan cowl 204 to transcowl 206 via devices including, without limitation, pins, fasteners, and latches to facilitate coupling fan cowl 204 to the transcowl translation system to power slide fan cowl 204 aft. Also, in some embodiments, power drive system 876 is a temporary, external system that is used during maintenance activities, and then removed from the vicinity of aircraft 100.

Further, in the exemplary embodiment, power drive system 876 includes a drive shaft 878 coupled to fan cowl 204. Alternatively, power drive system 876 may be coupled to a portion of fan cowl 204 through any device, including, without limitation, a limit stop (not shown). Power drive system 876 also includes a power source 880 that includes one of electric drive devices, hydraulic drive devices, and pneumatic drive devices that include, without limitation, one of an electric motor, a hydraulic motor, and a pneumatic motor. In some embodiments, power source 880 includes rate control devices, e.g., without limitation, a variable speed electric motor and a mechanical fluid control device, e.g., without limitation, hydraulic/pneumatic flow control valves and orifice restrictions. Power source 880 replaces manual operation of separating fan cowl 204 from wing pylon 112 and provides a mechanism for rate control.

Power drive system 876 further includes at least one drive arm position feedback device 882, e.g., without limitation, linear encoders. Alternatively, electric position sensors, such as, without exception, limit switches, may be coupled to fan cowl 204 and/or apron 848 to facilitate annunciating that fan cowl 204 is at least partially shifted forward or aft.

Power drive system 876 also includes a controller 884. Controller 884 is coupled to, and controls an operation of, power source 880. In the exemplary embodiment, controller 884 is implemented by at least one processor. As used herein, the processor includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

In addition, controller 884 includes at least one memory device (not shown) coupled to the processor that stores computer-executable instructions and data, such as operating data, parameters, setpoints, threshold values, and/or any other data that enables power drive system 876 to function as described herein. The memory device may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory.

The methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

In some embodiments, power drive system 876 includes a rate control device that is a clutch device 886 that is any clutch-type mechanism that enables operation of power drive system 876 as described herein including, without limitation, a pressure plate clutch, a magnetic clutch, and a hydraulic clutch.

Power source 880, controller 884, and clutch device 886 may be located anywhere on aircraft 100 or remotely from aircraft 100 to facilitate operation of mounting system 700 as described herein. Also, any number of power drive systems 876 may be used.

In operation, a force may be applied to fan cowl 204, e.g., a manual force applied by a user and/or a force applied by power drive systems 876 to move fan cowl 204 in aft axial direction AD, toward exhaust end 209, and over transcowl 206, such that fan cowl 204 slides toward aftward end 720 of slot 716 via slider fittings 722, 724, and 726. In another embodiment, when fan cowl 204 is coupled to transcowl 206 via tabs 846, a force may be applied to transcowl 206 to move transcowl 206 toward exhaust end 209 such that transcowl 206 pulls fan cowl 204 along slot 716 and toward exhaust end 209. To remove fan cowl 204 from slot 716, a user may unfasten cover plates 734 and 736 from wing pylon 112 and slide fan cowl 204 such that first slider fitting 722, second slider fitting 724, and third slider fitting 726 are aligned with first cutout 728, second cutout 730, and third cutout 732, respectively. Once first slider fitting 722, second slider fitting 724, and third slider fitting 726 are aligned with first cutout 728, second cutout 730, and third cutout 732, respectively, the user may pull first slider fitting 722 through first cutout 728, second slider fitting 724 through second cutout 730, and third slider fitting 726 through third cutout 732 to remove fan cowl 204 from slot 716.

Figure 8:
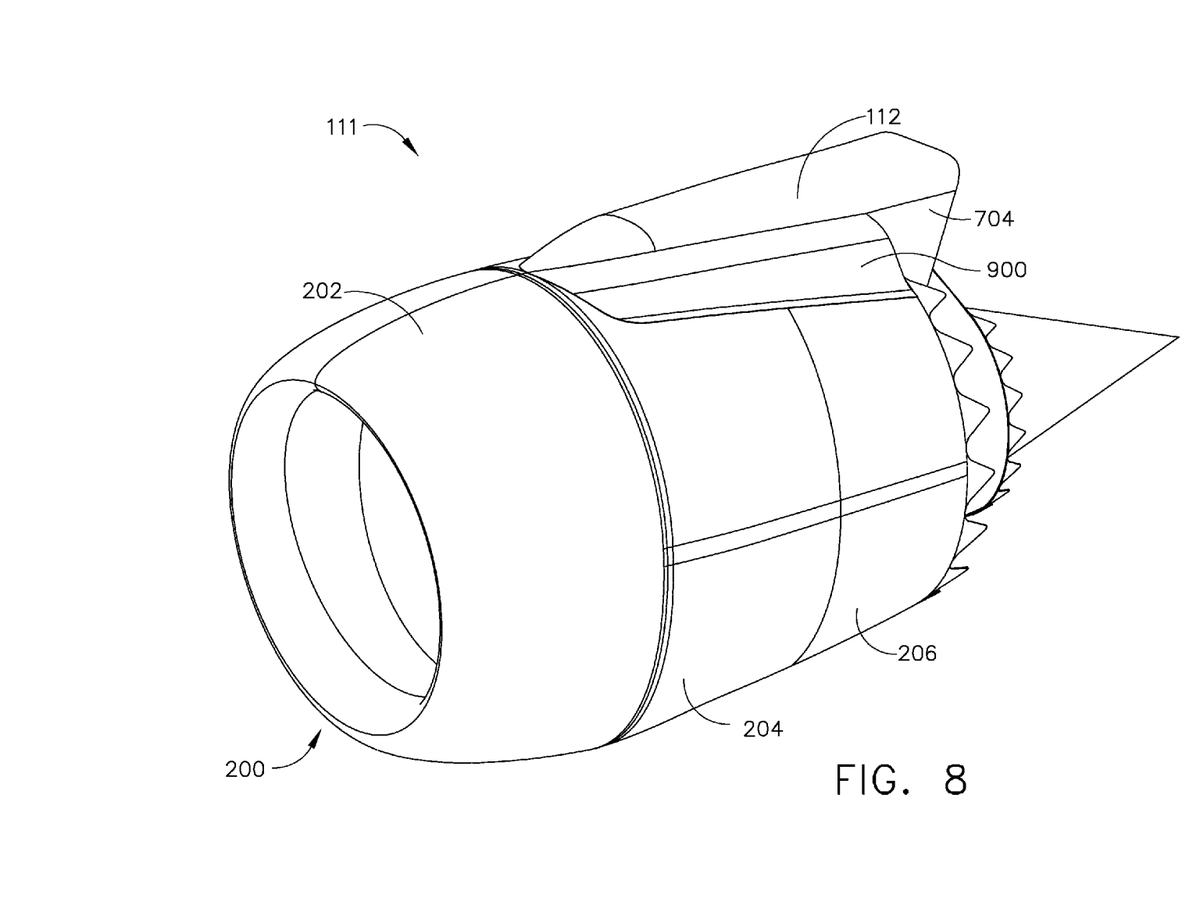
FIG. 8 is a perspective view of an exemplary fairing that may be used with the wing-mounted engine assembly and nacelle shown in FIG. 2.

FIG. 8 is a perspective view of an exemplary fairing 900 that may be used with wing-mounted engine assembly 111 and nacelle 200. In the exemplary embodiment, a first track fairing 900 is coupled between fan cowl 204 and first side 704 and is positioned over first track assembly 708 (shown in FIGS. 3 and 6) to facilitate reducing wind drag on first track assembly 708. In the exemplary embodiment, first track fairing 900 is coupled to fan cowl 204 using any suitable fastener (not shown), e.g., without limitation, a plurality of bolts. Also, first track fairing 900 is coupled in sliding engagement with wing pylon 112 such that first track fairing 900 is slideable with fan cowl 204 and against wing pylon 112. Alternatively, first track fairing 900 is fastened to wing pylon 112 using any suitable fastener e.g., without limitation, a plurality of bolts. Also, alternatively, first track fairing 900 is coupled in sliding engagement with fan cowl 204 such that fan cowl 204 is slideable against first track fairing 900. A second track fairing (not shown) is coupled between fan cowl 204 and second side 706 (shown in FIG. 3) and is positioned over second track assembly 710 (shown in FIG. 3) in the same manner as first track fairing 900 is positioned over first track assembly 708.

Figure 9:
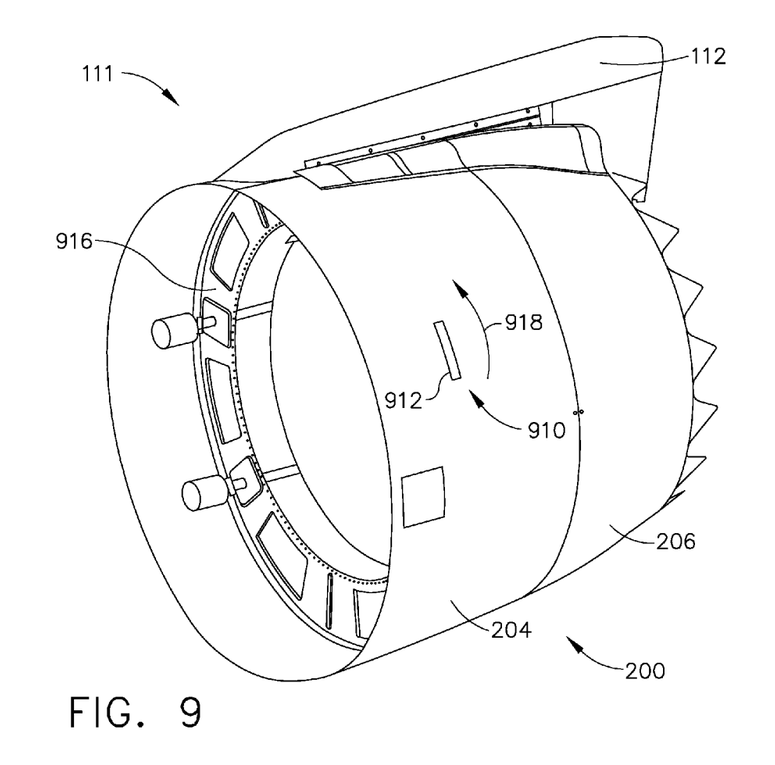
FIG. 9 is a perspective exterior view of an exemplary fan cowl locking device that may be used with the wing-mounted engine assembly and nacelle shown in FIG. 2.
Figure 10:
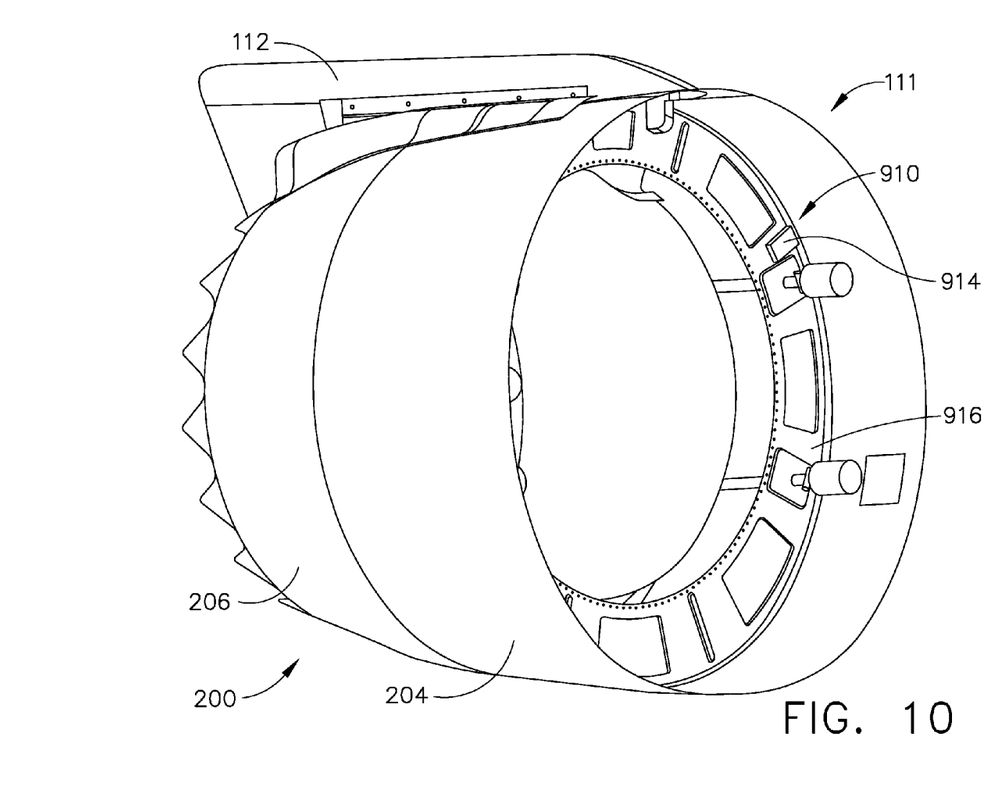
FIG. 10 is a perspective interior view of an exemplary fan cowl locking device that may be used with the wing-mounted engine assembly and nacelle shown in FIG. 2.

FIG. 9 is a perspective exterior view of an exemplary fan cowl locking device 910 that may be used with wing-mounted engine assembly 111 and nacelle 200. FIG. 10 is a perspective interior view of fan cowl locking device 910. In the exemplary embodiment, locking device 910 includes an exterior latch 912 (shown in the closed position). Locking device 910 also includes a latch keeper 914 that is coupled one of an inlet aft bulkhead (not shown), a thrust reverser forward bulkhead 916, and wing pylon 112. In the exemplary embodiment, locking device 910 is coupled to thrust reverser forward bulkhead 916. To open, latch 912 is rotated as shown by arrow 918 to release locking device 910 from its coupling to thrust reverser forward bulkhead 916. Alternatively, locking device 910 is any coupling/locking mechanism that enables operation of locking device 910 as described herein, including, without limitation, a pin lock device.

Figures 11, 12:
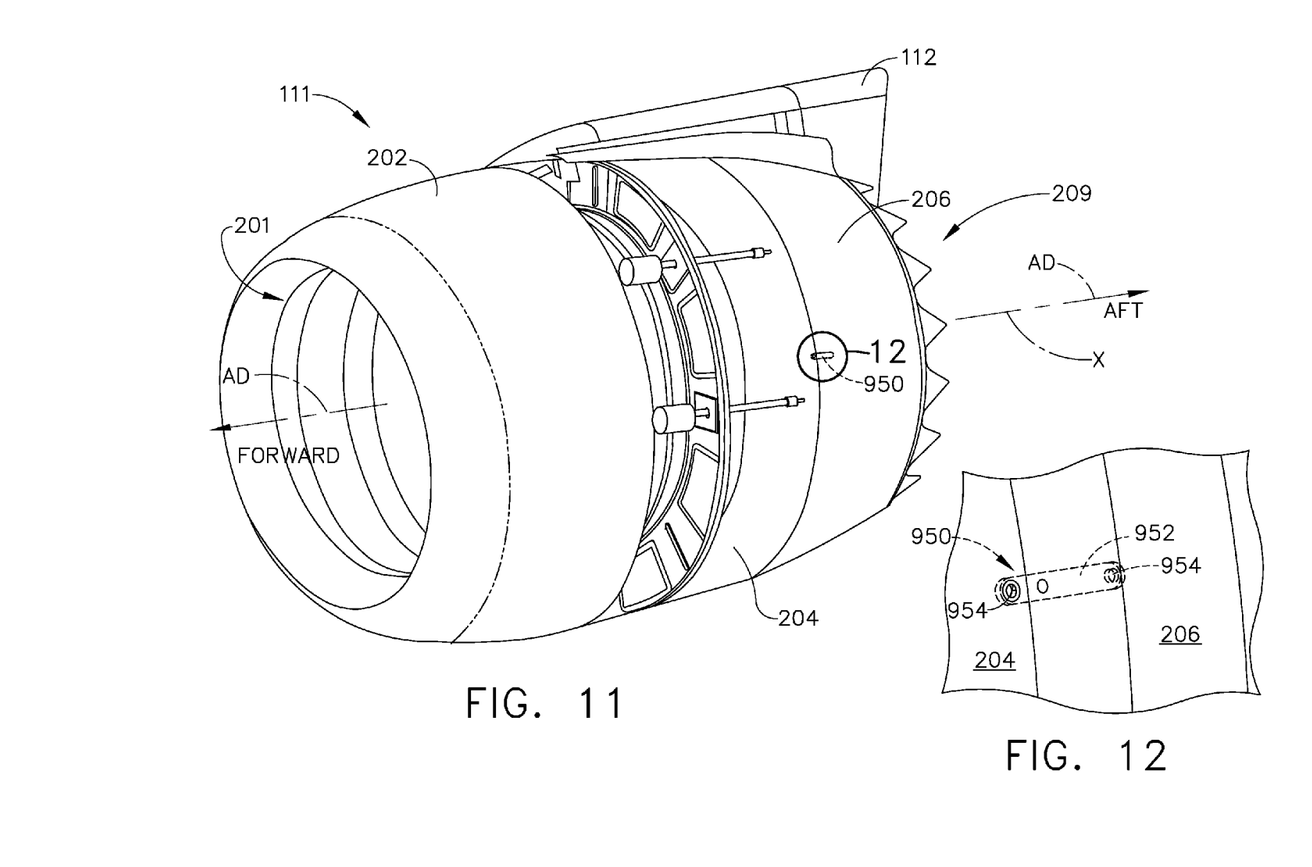
FIG. 11 is a perspective view of the wing-mounted engine assembly shown in FIG. 2 with an exemplary fan cowl-to-transcowl linkage device.
FIG. 12 is a schematic view of the fan cowl-to-transcowl linkage device shown in FIG. 11 taken along area 12.

FIG. 11 is a perspective view of wing-mounted engine assembly 111 with an exemplary fan cowl-to-transcowl linkage device 950. FIG. 12 is a schematic view of fan cowl-to-transcowl linkage device 950 taken along area 12 (shown in FIG. 11). In the exemplary embodiment, fan cowl 204 extends from forward of transcowl 206 to an overlapping relationship with transcowl 206. Transcowl 206 is movable with respect to engine assembly 111 along engine axis X toward at least one of inlet end 201 and exhaust end 209. Fan cowl 204 is coupled to transcowl 206 via at least one fan cowl-to-transcowl linkage device 950.

Linkage device 950 facilitates transmission of power generated by power drive system 876 (shown in FIG. 6) from transcowl 206 to fan cowl 204 to pull fan cowl 204 afterward with afterward movement of transcowl 206. In some embodiments, as described above, power drive system 876 is positioned in transcowl 206 or wing pylon 112. In some embodiments, all, or portions of, a transcowl translation system (not shown) perform the functions of power drive system 876 or those functions supplemented with power drive system 876.

In the exemplary embodiment, linkage device 950 includes a strip of material 952 coupled to fan cowl 204 and transcowl 206 with a plurality of fastening devices 954, e.g., without limitation, bolts. Strip of material 952 and fastening hardware 954 have any dimensions and are made of any materials that enable operation of linkage device 950 as described herein. Any number of linkage devices 950 that enables operation of wing-mounted engine assembly 111 are used.

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate adjusting a cowl. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

The nacelle described herein enables a cowl to be adjusted in a manner that facilitates elimination of hardware such as hinges, latches, and holding arms or hold-open rods, thereby decreasing a weight of the aircraft, thereby increasing engine efficiency by reducing fuel consumption of the engine. The nacelle described herein also enables a sliding arrangement to allow the cowls to move forward and/or aft, and to be removed completely, to provide access to the components under the cowl.

Exemplary embodiments of a nacelle and a method of assembling the same are described above in detail. The nacelle is not limited to the specific embodiments described herein, but rather, components of the nacelle may be utilized independently and separately from other components described herein. For example, the cowl described herein may have other industrial and/or consumer applications and is not limited to practice with a nacelle for a gas turbine engine as described herein. Rather, the cowl can be implemented and utilized in connection with many other industries.

While the invention has been described in terms of various specific embodiments, those skilled in the art will recognize that the invention can be practiced with modification within the spirit and scope of the claims.

What is claimed is:

1. A nacelle for housing an engine that includes an inlet end, an exhaust end, and an axis extending through the engine from the inlet end through the exhaust end, said nacelle comprising a fan cowl sized to cover at least a first axial portion of the engine and a trans cowl sized to cover at least a second axial portion of the engine aft of the fan cowl, said fan cowl coupled to an engine mounting pylon via a slider-type mounting system comprising at least one slider track assembly defining at least one slot therein, said at least one slot comprises at least one cutout, wherein said at least one cutout is configured to receive at least one fan cowl slider fitting, said fan cowl slidable, via the at least one fan cowl slider fitting, with respect to the engine along the axis toward the exhaust, and said fan cowl slidable over at least a portion of the transcowl or in conjunction with the transcowl.

2. The nacelle in accordance with claim 1, wherein said at least one fan cowl slider fitting is coupled to said fan cowl and said at least one slider track assembly is coupled to the engine mounting pylon.

3. The nacelle in accordance with claim 1, wherein said at least one slot comprises a plurality of cutouts, wherein each of said cutouts is configured to receive one of a plurality of fan cowl slider fittings.

4. The nacelle in accordance with claim 1, wherein said slider-type mounting system comprises said at least one slider track assembly on each side of the engine mounting pylon, wherein each of said at least one slider track assemblies comprise:
 a plurality of cutouts defined by said at least one slot; and
 a plurality of fan cowl slider fittings coupled to said fan cowl, wherein said fan cowl slider fittings are inserted in respective cutouts included in said plurality of cutouts.

5. The nacelle in accordance with claim 4, wherein said fan cowl slider fittings are slid along the axis toward the inlet end within said at least one slot to secure said fan cowl to the engine mounting pylon, and said fan cowl slider fittings are slid along the axis toward the exhaust end within said at least one slot to remove said fan cowl from the engine mounting pylon.

6. The nacelle in accordance with claim 1, wherein said slider-type mounting system further comprises at least one power drive system.

7. The nacelle in accordance with claim 6 wherein, said fan cowl extending from forward of said transcowl to an overlapping relationship with said transcowl, wherein said power drive system is coupled to said transcowl.

8. The nacelle in accordance with claim 1, wherein said slider-type mounting system further comprises at least one slider fitting retention plate removably coupled to said engine mounting pylon, said at least one slider fitting retention plate configured to restrict transverse motion of said at least one slider fitting.

9. The nacelle in accordance with claim 1 further comprising said fan cowl extending from forward of said transcowl to an overlapping relationship with said transcowl, said transcowl movable with respect to the engine along the axis toward at least one of the inlet end and the exhaust end, wherein said fan cowl is coupled to said transcowl via at least one linkage device, said at least one linkage device facilitates transmission of power from said transcowl to said fan cowl.

10. The nacelle in accordance with claim 1 further comprising a fan cowl locking device coupled to at least one of an inlet aft bulkhead, a thrust reverser forward bulkhead, and the engine mounting pylon.

11. A method of assembling a nacelle for a gas turbine engine that includes an inlet end, an exhaust end, and an axis that extends through the engine from the inlet end through the exhaust end, said method comprising:

provinding a fan cowl sized to cover at least a first axial portion of the engine;

providing a trans cowl, aft of the fan cowl, sized to cover at least a second axial portion of the engine;

extending the fan cowl about the first axial portion of the engine and the transcowl about the second axial portion of the engine;

providing a slider-type mounting system including at least one slider track assembly defining at least one slot therein comprising at least one cutout, wherein the at least one cutout is configured to receive at least one fan cowl slider fitting;

sliding, with respect to the engine along the axis toward the exhaust, said fan cowl along the at least one slider track, and sliding said fan cowl over at least a portion of the transcowl or in conjunction with the transcowl; and coupling the fan cowl to an engine mounting pylon via the slider-type mounting system.

12. The method in accordance with claim 11, wherein coupling the fan cowl to the engine mounting pylon comprises:

coupling the at least one fan cowl slider fitting to the fan cowl; and coupling the at least one slider track assembly to the engine mounting pylon.

13. The method in accordance with claim 11, wherein providing a slider-type mounting system including at least one slider track assembly defining at least one slot therein comprises forming a plurality of cutouts, wherein each of the cutouts is configured to receive one of a plurality of fan cowl slider fittings.

14. The method in accordance with claim 11, wherein providing a slider-type mounting system including at least one slider track assembly comprises providing a slider track assembly on each side of the engine mounting pylon comprising:

forming a plurality of cutouts in each of the slider track assemblies; and coupling a plurality of fan cowl slider fittings to the fan cowl comprising inserting each of the fan cowl slider fittings in each of the plurality of cutouts.

15. The method in accordance with claim 14 further comprising:

sliding the fan cowl slider fittings along the axis toward the inlet end within the at least one slot to secure the fan cowl to the engine mounting pylon; and sliding the fan cowl slider fittings along the axis toward the outlet end within the at least one slot to remove the fan cowl from the engine mounting pylon.

16. The method in accordance with claim 11, wherein providing the slider-type mounting system comprises providing at least one power drive system.

17. The method in accordance with claim 16 further comprising:

providing the fan cowl forward of the transcowl in at least a partially overlapping relationship with the transcowl; and coupling the power drive system to the transcowl.

18. The method in accordance with claim 11, wherein providing a slider-type mounting system comprises removably coupling at least one slider fitting retention plate to the engine mounting pylon, wherein the at least one slider fitting retention plate is configured to restrict transverse motion of the at least one slider fitting.

19. The method in accordance with claim 11 further comprising:

providing the fan cowl forward of the transcowl in at least a partially overlapping relationship with the transcowl, wherein the transcowl is movable with respect to the engine along the axis toward at least one of the inlet end and the exhaust end; and coupling the fan cowl to the transcowl via at least one linkage device, wherein the at least one linkage device facilitates transmission of power from the transcowl to the fan cowl.

20. The method in accordance with claim 11 further comprising coupling the fan cowl to at least one of an inlet aft bulkhead, a thrust reverser forward bulkhead, and the engine mounting pylon via at least one fan cowl locking device.

* * * * *

UNITED STATES PATENT AND TRADEMARK OFFICE
CERTIFICATE OF CORRECTION

| | | |
|---|---|---|
| PATENT NO. | : 9,188,026 B2 | Page 1 of 1 |
| APPLICATION NO. | : 13/524127 | |
| DATED | : November 17, 2015 | |
| INVENTOR(S) | : Calder et al. | |

It is certified that error appears in the above-identified patent and that said Letters Patent is hereby corrected as shown below:

IN THE SPECIFICATION

In Column 3, Line 44, delete "afterward" and insert -- aftward --, therefor.

In Column 7, Lines 9-10, delete "afterward with afterward" and insert -- aftward with aftward --, therefor.

IN THE CLAIMS

In Column 8, Line 6, in Claim 1, delete "trans cowl" and insert -- transcowl --, therefor.

In Column 9, Line 5, in Claim 11, delete "trans cowl," and insert -- transcowl, --, therefor.

Signed and Sealed this
Twenty-ninth Day of March, 2016

Michelle K. Lee
*Director of the United States Patent and Trademark Office*